(12) United States Patent
Xue et al.

(10) Patent No.: US 12,514,154 B2
(45) Date of Patent: Jan. 6, 2026

(54) MOWER SYSTEM, METHOD FOR SETTING ROTATING SPEED OF CUTTER AND MOWER SYSTEM MANAGEMENT METHOD

(71) Applicant: Globe (Jiangsu) Co., Ltd., Changzhou (CN)

(72) Inventors: Jiafu Xue, Changzhou (CN); Shiyuan Ding, Changzhou (CN); Jing Wang, Changzhou (CN); Qunli Wei, Changzhou (CN); Peng Zhao, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 1195 days.

(21) Appl. No.: 17/385,864

(22) Filed: Jul. 26, 2021

(65) Prior Publication Data

US 2022/0039312 A1    Feb. 10, 2022

(30) Foreign Application Priority Data

Aug. 7, 2020    (CN) .......................... 202010787761.1

(51) Int. Cl.
*A01D 34/00*    (2006.01)
*A01D 34/66*    (2006.01)
(Continued)

(52) U.S. Cl.
CPC .......... *A01D 34/006* (2013.01); *A01D 34/66* (2013.01); *A01D 34/78* (2013.01); *A01D 69/02* (2013.01); *A01D 2101/00* (2013.01)

(58) Field of Classification Search
CPC ...... A01D 34/006; A01D 34/66; A01D 34/78; A01D 69/02; A01D 2101/00; A01D 34/58;
(Continued)

(56) References Cited

U.S. PATENT DOCUMENTS

2004/0163373 A1* 8/2004 Adams .................... A01D 34/78
56/10.2 R
2013/0047565 A1* 2/2013 Shida ...................... A01D 34/58
56/10.2 H
(Continued)

FOREIGN PATENT DOCUMENTS

CN    102686100 A    9/2012
CN    109463095 A  *  3/2019 ........... A01D 34/006
(Continued)

*Primary Examiner* — Kyle J Kingsland

(57) ABSTRACT

The disclosure provides a mower system, a method for setting the rotating speed of a cutter and a mower system management method. The system comprises: a vehicle control unit for controlling the mower to operate; a walking unit for receiving a control signal of the vehicle control unit to control the walking of the mower and perform state feedback to the vehicle control unit; a cutter unit for receiving a control signal sent by the vehicle control unit to control the cutter to run and carrying out state feedback to the vehicle control unit; and a battery management system for performing state feedback on the working state of the battery to the vehicle control unit. The cutter rotating speed can be adjusted instantly according to the vehicle speed, and when the cutter motor enters limit state, the speed can be limited.

19 Claims, 7 Drawing Sheets

(51) Int. Cl.
  *A01D 34/78* (2006.01)
  *A01D 69/02* (2006.01)
  *A01D 101/00* (2006.01)

(58) Field of Classification Search
  CPC ...... A01D 34/008; A01D 34/44; A01D 34/62; A01D 67/00
  See application file for complete search history.

(56) References Cited

U.S. PATENT DOCUMENTS

| | | | |
|---|---|---|---|
| 2013/0167495 | A1 | 7/2013 | Borinato |
| 2018/0338417 | A1* | 11/2018 | Matsuda .............. A01D 34/006 |
| 2019/0075724 | A1* | 3/2019 | Becke ................. A01D 34/006 |
| 2020/0163275 | A1* | 5/2020 | Zhao .................. G05B 23/0259 |

FOREIGN PATENT DOCUMENTS

| | | |
|---|---|---|
| CN | 210053870 U | 2/2020 |
| CN | 110915404 A | 3/2020 |
| CN | 210694954 U | 6/2020 |
| JP | 2018196354 A | 12/2018 |

\* cited by examiner

MOWER SYSTEM, METHOD FOR SETTING ROTATING SPEED OF CUTTER AND MOWER SYSTEM MANAGEMENT METHOD

CROSS REFERENCE TO RELATED APPLICATION

The present application claims the priority of the following Chinese patent applications: serial No. CN202010787761.1, filed Aug. 7, 2020; the disclosure of which is hereby incorporated by reference herein in its entirety for all purposes.

TECHNICAL FIELD

The disclosure relates to a mower system, a method for setting the rotating speed of a cutter, and a mower system management method, which belongs to the field of mowers.

BACKGROUND

Conventionally, the rotating speed of the cutter of most electric mowers is set to a certain fixed value or the user can choose to adjust the rotating speed to high or low through the speed selection switch. However, the height of the cutting deck during operation are different under actual working conditions, especially the driving speed of the mower is different during the mowing operation, and the rotating speed of the cutter motor required to achieve an effective mowing effect is also different.

In most cases, the rotating speed of the cutter is generally set as the rotating speed of the cutter for achieving the mowing effect at the maximum mower speed, and the setting of the rotating speed of the cutter is higher, so that higher blade wind resistance is caused by too high rotating speed of the cutter, and the energy consumption power of the cutter motor is higher than the actual required power of the mowing working condition.

Because the electric mower is limited by the cost and the size of the vehicle, the capacity of a power battery carried by the electric mower is very limited, the mowable area of the electric mower can be reduced due to the excessive power of a cutter motor, the larger working noise can be generated due to the excessive rotating speed of the cutter and the use experience is influenced. In addition, under the condition that the lawn is flourishing and the speed of the mower is high, the constant rotating speed of the cutter can lead to the sharply increasing to the load of the cutter motor. Running the cutter motor at a high load for a long time may cause serious overheating, which may trigger the heating alarm and stop the motor, and more seriously damage the motor; and if the capacity of a vehicle-mounted battery is small, a larger operation power can also trigger the battery overload alarm.

SUMMARY

The disclosure provides a mower system, a method for setting a rotating speed of a cutter, and a management method for the mower system, which adjust the rotating speed of the cutter and vehicle speed of the mower according to actual working conditions to improve the efficiency of the mower.

The disclosure provides a mower system, including:
a vehicle control unit, which is used for controlling a mower to operate;
a walking unit, including a walking motor controller and a walking motor, which are used for receiving a control signal from the vehicle control unit to control the walking of the mower and provide a state feedback to the vehicle control unit;
a cutter unit, including at least one cutter, a cutter motor used for driving the cutter to operate, and a cutter motor control unit used for controlling the cutter motor, wherein the cutter motor control unit receives a control signal sent by the vehicle control unit to control the cutter to operate and carries out a state feedback to the vehicle control unit; and
a battery management system, which is used for performing a state feedback on the working state of a battery to the vehicle control unit wherein
a rotating speed of the cutter is adjusted by the vehicle control unit according to a vehicle speed to reduce an energy consumption of the mower.

Optionally, the vehicle control unit adjusts the rotating speed of the cutter based on a fixed ratio to the vehicle speed.

Optionally, the system further comprises a cutter governor switch, and the vehicle control unit receives a signal generated by the cutter governor switch to regulate the rotating speed of the cutter based on an adjustable ratio to the vehicle speed.

Optionally, the state feedback of the walking unit comprises: a vehicle speed of the mower, a rotating speed of the walking motor, a temperature of the walking motor, a temperature of the walking motor controller, and a power of the walking motor.

Optionally, the state feedback of the cutter unit comprises: a temperature of the cutter motor control unit, a power of the cutter motor, a rotating speed of the cutter motor and a temperature of the cutter motor.

Optionally, the state feedback of the battery management system comprises: an output power and a temperature of the battery.

The disclosure also provides a method for setting a rotating speed of a cutter of the mower system, as described above and the ratio of the rotating speed of the cutter to the vehicle speed being a fixed value, the method including:
starting the mower;
setting the rotating speed of the cutter to be as a lowest rotating speed $n_0$ for the operation of the cutter when the vehicle speed V of the mower is less than a lowest speed $V_0$ for normal operation of mower; and setting the rotating speed of the cutter to be n, when the vehicle speed V is greater than or equal to $V_0$.

Optionally, when the vehicle speed of the mower is V, the rotating speed of the cutter is set as follows:

$$n = n_0 + (V - V_0) * K_g$$

V is greater than or equal to $V_0$, $K_g$ is a ratio of rotating speed of the cutter to vehicle speed, and $K_g$ is a fixed value; the formula of the cutter rotating speed to vehicle speed ratio Kg is as follows:

$$K_g = (n_{max} - n_0)/(V_{max} - V_0),$$

$V_0$ is the lowest speed for normal operation of mower, $n_0$ is the lowest operating speed of the cutter, $V_{max}$ is the highest speed for normal operation of mower, and $n_{max}$ is the highest operating speed of the cutter.

Optionally, the mower system further comprises a cutter governor switch for outputting a control signal to the vehicle control unit, so that the vehicle control unit adjusts the rotating speed of the cutter to vehicle speed ratio according to the control signal.

Optionally, after the mower system is provided with the cutter governor switch, the formula of the rotating speed of the cutter to vehicle speed ratio is as follows:

$$K_b = K_1 * (n_{max} - n_0)/(V_{max} - V_0),$$

$K_b$ is a cutter rotating speed to vehicle speed ratio, and the value of $K_1$ depends on a control signal input by a cutter governor switch.

Optionally, the cutter governor switch comprises an install panel, a knob, and a sign, wherein the install panel is provided with a buckle or a through hole and is mounted on the mower through mechanical connection.

The disclosure also provides a method for managing a mower system and improving the stability of the mower system, the method comprising:

respectively presetting recovery conditions, protection conditions, alarm conditions, shutdown conditions, trigger duration and response duration of a battery management system, a cutter motor control unit, a walking motor controller, a walking motor and a cutter motor in the mower system;

reducing current vehicle speed according to a reduction ratio coefficient and correspondingly reducing the rotating speed of the cutter along with the reduction of the vehicle speed, if the state of any one of the battery management system, the cutter motor control unit, the walking motor controller, the walking motor or the cutter motor meets the protection condition and the duration of the protection condition exceeds the triggering duration;

if the protection condition is still met and the duration of the protection condition exceeds the response duration, continuously reducing the current vehicle speed according to the reduction ratio coefficient, and simultaneously correspondingly reducing the rotating speed of the cutter along with the reduction of the vehicle speed until the current vehicle speed is less than or equal to the lowest normal operation speed of the mower;

if the alarm condition is met and the duration of the alarm condition exceeds the trigger duration, reducing the vehicle speed to the lowest normal operation speed of the mower, correspondingly reducing the rotating speed of the cutter along with the reduction of the vehicle speed, and alarming and prompting an operator to check the vehicle state; and if the shutdown condition is met and the duration of the shutdown condition exceeds the trigger duration, shutting down the mower and alarming.

Optionally, numerically, a threshold of the recovery condition<a threshold of the protection condition<a threshold of the alarm condition<a threshold of the shutdown condition.

Optionally, the reduction ratio coefficient is set from 0.7 to 0.9.

Optionally, the trigger duration is set from 1 s to 3 s.

Optionally, the response duration is set from 5 s to 10 s.

Optionally, before the mower stops, if the state of any one of the battery management system, the cutter motor control unit, the walking motor controller, the walking motor or the cutter motor is lower than the recovery condition and the duration thereof exceeds the response duration, the current speed is increased according to an acceleration ratio coefficient, and the rotating speed of the cutter is correspondingly increased along with the increase of the speed until the normal working state is recovered.

Optionally, the acceleration ratio coefficient is set from 1.05 to 1.15.

Optionally, the recovery condition, the protection condition, the alarm condition and the shutdown condition can be recovery temperature, protection temperature, alarm temperature and shutdown temperature respectively, and energy consumption management is carried out by monitoring the temperature, specifically the method including:

respectively presetting recovery temperature, protection temperature, alarm temperature, shutdown temperature, trigger duration and response duration of the battery management system, the cutter motor control unit, the walking motor controller, the walking motor and the cutter motor;

if the temperature of any one of the battery management system, the cutter motor control unit, the walking motor controller, the walking motor or the cutter motor is greater than the protection temperature and the duration thereof exceeds the trigger duration, reducing the current vehicle speed according to a speed reduction ratio coefficient, and correspondingly reducing the rotating speed of the cutter along with the reduction of the vehicle speed;

if the duration of the temperature greater than the protection temperature exceeds the response duration and the temperature is still greater than the protection temperature, continuously reducing the current vehicle speed according to the reduction ratio coefficient, and simultaneously correspondingly reducing the rotating speed of the cutter along with the reduction of the vehicle speed until the current vehicle speed is less than or equal to the lowest normal operation speed of the mower;

if the temperature is greater than the alarm temperature and the duration thereof exceeds the trigger duration, reducing the speed to the lowest speed of normal operation of the mower, meanwhile, correspondingly reducing the rotating speed of the cutter along with the reduction of the speed, and alarming and prompting an operator to check the state of the vehicle; and if the temperature is greater than the shutdown temperature and the duration thereof exceeds the triggering duration, shutting down the mower and alarming.

Optionally, the recovery condition, the protection condition, the alarm condition and the shutdown condition can be recovery current, protection current, alarm current and shutdown current respectively, and energy consumption management is carried out by monitoring the discharge current of the battery management system, the method further comprising:

presetting recovery current, protection current, alarm current, shutdown current, trigger duration and response duration of the battery management system;

if the discharge current of the battery management system is greater than the protection current and the duration thereof exceeds the trigger duration, reducing the current vehicle speed according to a reduction ratio coefficient, and simultaneously correspondingly reducing the rotating speed of the cutter along with the reduction of the vehicle speed;

if the duration of the discharge current greater than the protection current exceeds the response duration and the discharge current is still greater than the protection current, continuously reducing the current vehicle speed according to the reduction ratio coefficient, and simultaneously correspondingly reducing the rotating speed of the cutter along with the reduction of the vehicle speed until the current vehicle speed is less than or equal to the lowest normal operation speed of the mower;

if the current is greater than the alarm current and the duration thereof exceeds the trigger duration, reducing the vehicle speed to the lowest normal operation speed of the mower, meanwhile, correspondingly reducing the rotating speed of the cutter along with the reduction of the vehicle speed, and alarming and prompting an operator to check the vehicle state; and if the current is greater than the shutdown current and the duration thereof exceeds the triggering duration, shutting down the mower and alarming.

Optionally, carrying out energy consumption management by monitoring the current of the cutter motor control unit, and the method further comprising:

presetting the maximum working current and the recovery current of the cutter motor control unit;

if the current of the cutter motor control unit is greater than or equal to the maximum working current and the duration thereof exceeds the trigger duration, reducing the current vehicle speed according to a reduction ratio coefficient, and simultaneously correspondingly reducing the rotating speed of the cutter along with the reduction of the vehicle speed until the current vehicle speed is less than or equal to the lowest normal operation speed of the mower;

if the current of the cutter motor control unit is greater than or equal to the maximum working current and the duration thereof exceeds the response duration, continuously reducing the current vehicle speed according to the reduction ratio coefficient, and simultaneously correspondingly reducing the rotating speed of the cutter along with the reduction of the vehicle speed until the current vehicle speed is less than or equal to the lowest normal operation speed of the mower; and if the current of the cutter motor control unit is less than the recovery current and the duration thereof exceeds the response duration, increasing the current vehicle speed according to an acceleration ratio coefficient, and simultaneously correspondingly increasing the rotating speed of the cutter along with the increase of the vehicle speed until the normal working state is recovered The beneficial effects of the disclosure are: it can instantly adjust the speed of the cutter according to the change of the vehicle speed to improve the efficiency of the system; at the same time, when the cutter motor enters the limit state, the vehicle speed can be limited, so that while the effect of mowing is satisfied, the cutter can be protected, and the energy consumption of mowers can be reduced.

DETAILED DESCRIPTION

In order to make the objectives, technical solutions and advantages of the disclosure clearer, the disclosure will be described in detail below with reference to the accompanying drawings and specific embodiment.

Figure 1:
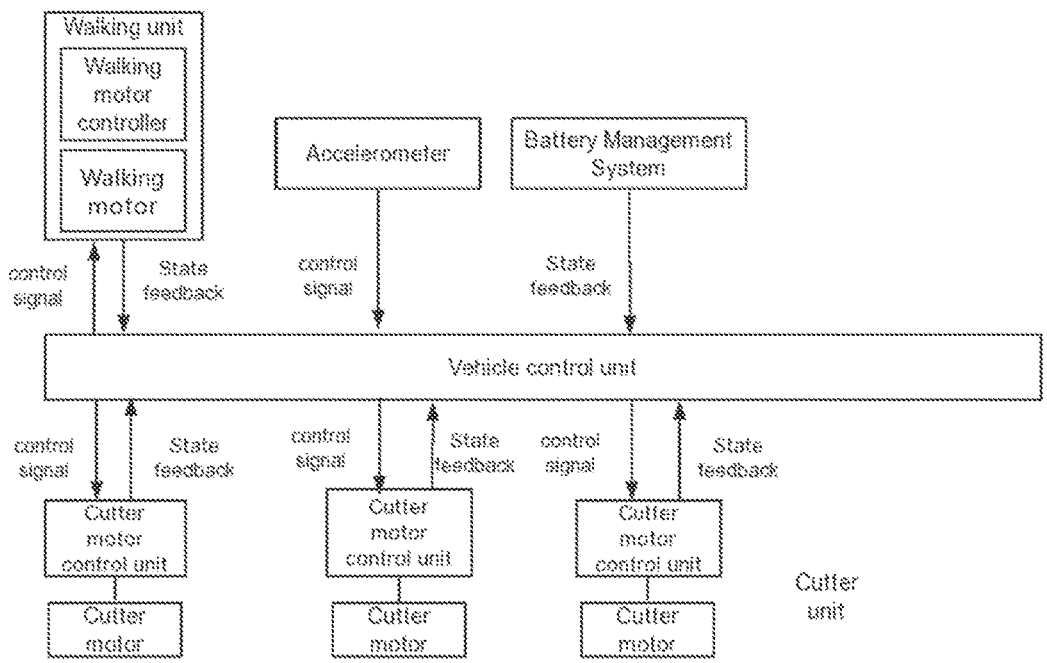
FIG. 1 is a block diagram of the mower system of the present disclosure.

As shown in FIG. 1, the disclosure shows a mower system, which is used for improving the efficiency of the mower and managing the energy consumption of the system, comprising: a vehicle control unit, a walking unit, a cutter unit, and a battery management system.

The vehicle control unit is used for controlling the mower to operate;

the walking unit comprises a walking motor controller and a walking motor, and is used for receiving a control signal sent by the vehicle control unit so as to control the walking of the mower and perform state feedback to the vehicle control unit;

the cutter unit comprises at least one cutter, a cutter motor used for driving the cutter to operate, and a cutter motor control unit used for controlling the cutter motor, wherein the cutter motor control unit receives a control signal sent by the vehicle control unit to control the cutter to operate and carries out state feedback to the vehicle control unit; and the battery management system is used for performing state feedback on the working state of the battery to the vehicle control unit.

The content of state feedback of the walking unit comprises a vehicle speed of the mower, a rotating speed of the walking motor, a temperature of the walking motor, a temperature of the walking motor controller, and a power of the walking motor. The walking motor controller controls the mower to accelerate or decelerate by increasing or decreasing the torque of the walking motor.

The state feedback of the cutter unit means that: a temperature of the cutter motor control unit, a power of the cutter motor, a rotating speed of the cutter motor, and a temperature of the cutter motor. One cutter of this embodiment is driven by one cutter motor, and one cutter motor is individually controlled by one cutter motor control unit, i.e., one cutter corresponds to one cutter motor and one cutter motor control unit. More specifically, the embodiment is provided with three cutters which are respectively driven by three cutter motors;

The state feedback of the battery management system includes: an output power and a temperature of the battery.

The mower system further comprises an accelerometer for measuring acceleration of the mower.

Figure 2:
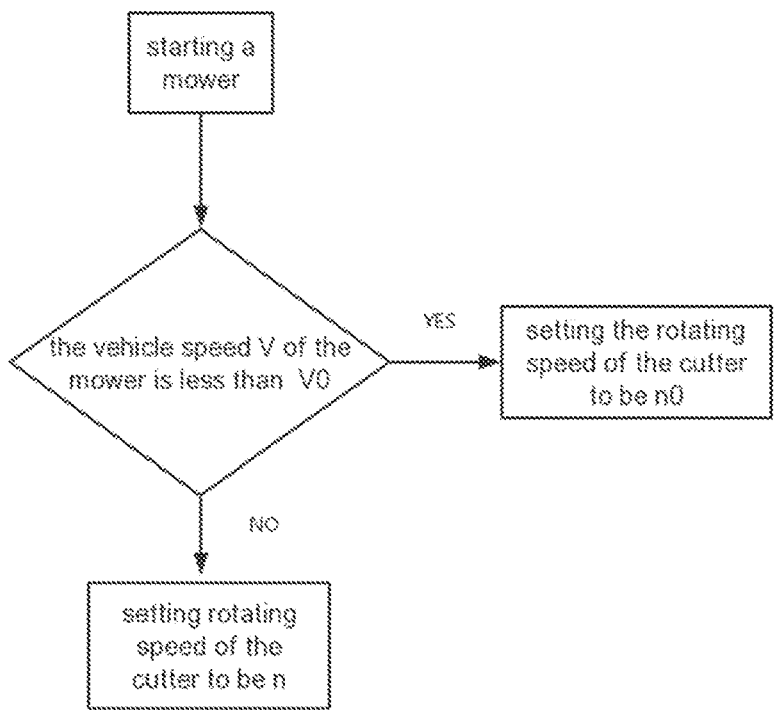
FIG. 2 is a flow chart of a method for setting the rotating speed of a cutter.

As shown in FIG. 2, the disclosure shows a method for setting a rotating speed of a cutter, wherein the ratio of the rotating speed of the cutter to the vehicle speed of the mower is a fixed value, the method including:

starting a mower; and when the speed V of the mower is less than the lowest normal operation speed $V_0$, setting the rotating speed of the cutter to be the working minimum rotating speed $n_0$; and when the vehicle speed V is greater than or equal to $V_0$, setting the rotating speed of the cutter to be n.

When the speed of the mower is V, the rotating speed of the cutter is set as follows:

$$n=n_0+(V-V_0)*K_g$$

V is greater than or equal to $V_0$, $K_g$ is a ratio of a rotating speed of the cutter to a vehicle speed, and Kg is a fixed value, when the rotating speed of the cutter is n, the maximum vehicle speed that can achieve the mowing effect is:

$$V=(n-n_0)/K_g+V_0.$$

The formula for the ratio of rotating speed of the cutter to vehicle speed $K_g$ is:

$$K_g=(n_{max}-n_0)/(V_{max}-V_0),$$

$V_0$ is the lowest normal operating speed of the mower, $n_0$ is the lowest operating speed of the cutter, $V_{max}$ is the highest normal operating speed of the mower, and $n_{max}$ is the highest operating speed of the cutter.

Figure 3:
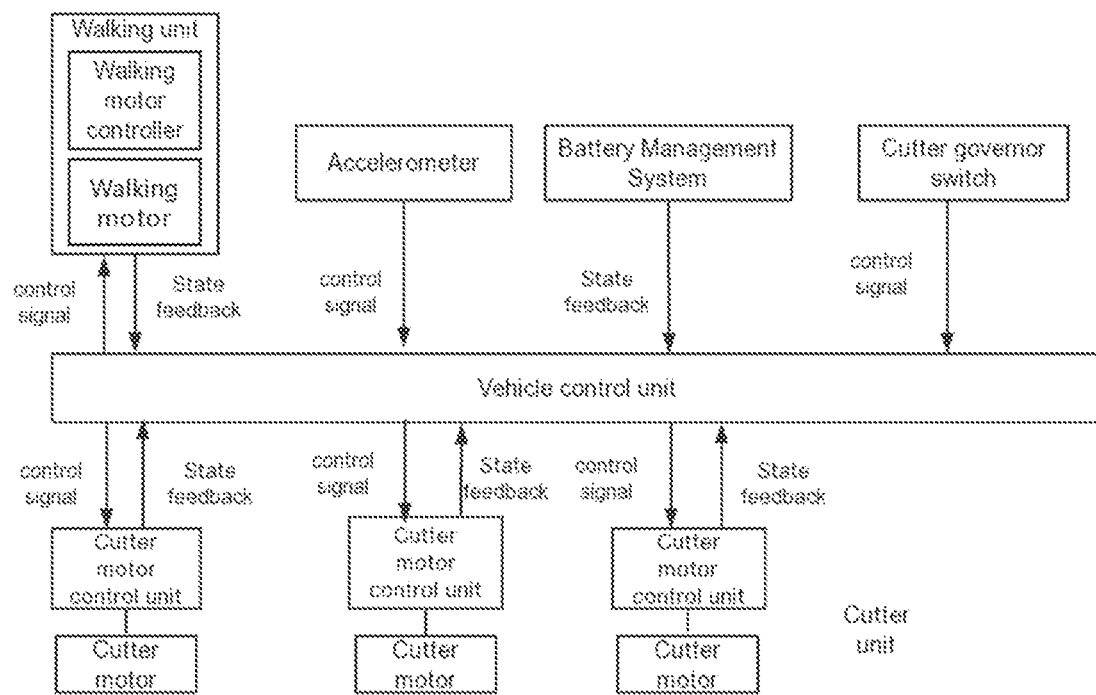
FIG. 3 is a block diagram of mower system with a cutter governor switch.

As shown in FIG. 3, as a further aspect of the disclosure, the mower system further includes a cutter governor switch for outputting a control signal to the vehicle control unit, the vehicle control unit receiving the signal generated by the governor switch to adjust the rotating speed of the cutter based on an adjustable ratio to the vehicle speed.

Figure 4:
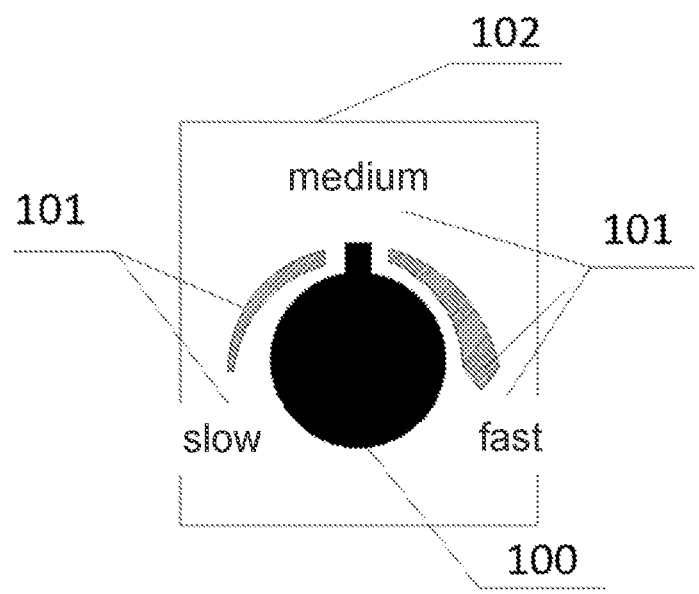
FIG. 4 is a schematic view of the cutter governor switch of FIG. 3.

As shown in FIG. 4, the cutter governor switch comprises a mounting panel, a knob, and a mark, wherein the mounting panel is provided with a buckle or a through hole and is mounted on the mower through mechanical connection; the knob rotates to output continuous electric signals to the vehicle control unit, and the knob can be a potentiometer, a resistance knob, and other components; the mark is used for marking the relation between the direction of the knob and the rotating speed of the cutter.

When the required power of the cutter operation is larger than the rated power of the cutter motor, the power of the cutter motor can be reduced by adjusting the rotating speed of the cutter, and the problem of overload of the cutter motor is solved.

When the mower system is equipped with a cutter governor switch, the formula for the ratio of the rotating speed of the cutter to the vehicle speed of the mower is:

$$K_b=K_1*(n_{max}-n_0)/(V_{max}-V_0),$$

$K_b$ is a ratio of rotating speed of the cutter to vehicle speed, the value of $K_1$ depends on a control signal input by the cutter governor switch, and different $K_1$ values can be generated by adjusting the position of the cutter governor switch by a user so as to adapt to different lawns. According to the experiment, when the lowest speed of the mower is $V_0$, the purpose of mowing can be achieved, and on the basis of the experiment, the lowest working rotating speed $n_0$ of the cutter can be obtained for adapting to different lawns; when the maximum speed of the mower is $V_{max}$, the mower can also achieve the purpose of mowing, on the basis of which the maximum speed $n_{max}$ of the cutter can be obtained to adapt to different lawns.

The test principle is described in detail below.

Figure 5:
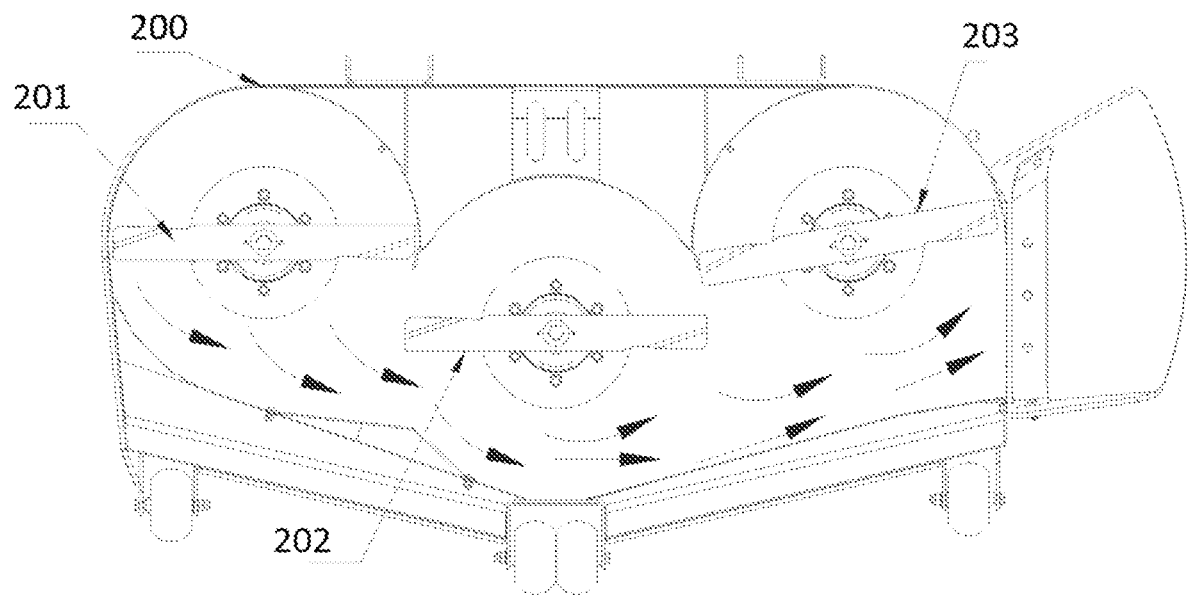
FIG. 5 is a schematic view showing a structure in which the cutting deck 200 is coupled with three cutters.

As shown in FIG. 5, the cutting deck 200 is equipped with three cutters: a first cutter 201, a second cutter 202, a third cutter 203, and the three cutters rotate anticlockwise, and a schematic diagram of the mowing operation is shown by arrows in FIG. 5.

Figure 6:
FIG. 6 is a schematic view showing the structure of the cutter of FIG. 5.

As shown in FIG. 6, which is a schematic view of the shape of the cutter, the cutter operates at a high speed and breaks the grass by cutter tips 208.

Figure 7:
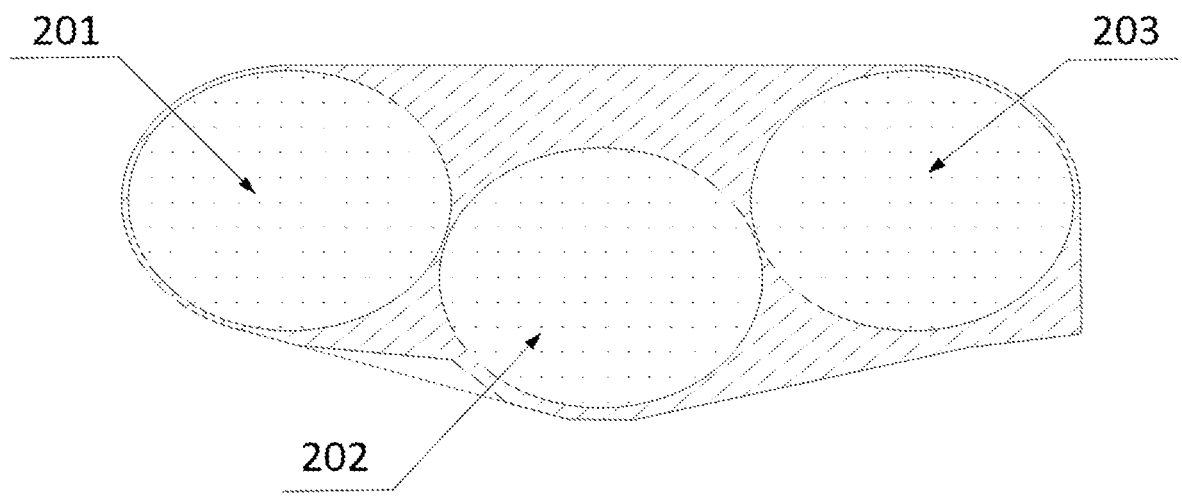
FIG. 7 is a view showing a shape of a space formed between the vane 207 of FIG. 5 and the panel of the cutting deck 200.

As shown in FIG. 7, in the space formed between vanes 207 and panel of the cutting deck 200, during the high-speed rotation process of the cutter, the vanes 207 generate negative pressure, crushed grass broken by the cutter tips 208 is adsorbed to the periphery of the cutter blades, airflow is generated along the rotation directions of the three cutters, and the crushed grass is blown out of the cutting deck.

The power consumption of the mowing motor is mainly composed of the mowing power for cutting the stalks and the power for overcoming the wind resistance by the cutter, the cutting power is proportional to the mowing area in unit time, and the following formula can be obtained:

$$P_c=P_0*B*V/102,$$

$P_c$ is the cutting power (w) of the cutter, $P_0$ is the power ($Nm/m^2$) required for cutting straws per square meter area, B is the cutter pair (m), V is the vehicle speed (m/s) of the mower, $P_0$ is related to the density and variety of grass, and the cutting amplitude of the cutter can not be changed after the parameters are determined. It can be concluded that the power of the cutter required for cutting the same lawn is approximately linearly proportional to the vehicle speed of the mower.

In order to ensure that the crushed grass does not block the cutting deck, it is necessary to ensure that the cutter has a certain rotating speed. When the mower advances at a low speed, the mowing amount in unit time is small, and the required air exhaust amount is small; when the mower advances at a high speed, the mowing amount per unit time is large, the corresponding required air exhaust amount is large, the higher the rotating speed of the cutter is, the more the air exhaust amount is, and the larger the power consumed for overcoming the wind resistance is. Therefore, under the condition that the mowing effect is guaranteed, the rotating speed of the cutter is changed along with the vehicle speed, the air exhaust efficiency can be higher, and the power of the cutter for overcoming the wind resistance is reduced.

When the system is abnormal in temperature and power, the rotating speed of the cutter can be correspondingly reduced by reducing the vehicle speed of the mower, the operation area in unit time is reduced, the required operation power is reduced, and the operation system of the mower is protected while the mowing operation effect is met.

Therefore, the disclosure also provides a method for managing the mower system and improving the stability of the mower system, and the method comprises:

respectively presetting recovery condition, protection condition, alarm condition, stop condition, trigger duration, and response duration of a battery management system, a cutter motor control unit, a walking motor controller, a walking motor, and a cutter motor;

if the state of any one of the battery management system, the cutter motor control unit, the walking motor controller, the walking motor or the cutter motor meets the protection condition and the duration exceeds the trigger duration, reducing the current vehicle speed according to a reduction ratio coefficient, and correspondingly reducing the rotating speed of the cutter along with the reduction of the vehicle speed;

if the duration for meeting the protection condition exceeds the response time and the protection condition is still met, continuously reducing the current vehicle speed according to the reduction ratio coefficient, and simultaneously correspondingly reducing the rotating speed of the cutter along with the reduction of the vehicle speed until the current vehicle speed is less than or equal to the lowest normal operation speed of the mower;

if the alarm condition is met and the duration exceeds the trigger duration, reducing the vehicle speed to the lowest normal operation speed of the mower, correspondingly reducing the rotating speed of the cutter along with the reduction of the vehicle speed, and alarming and prompting an operator to check the vehicle state; and if the shutdown condition is met and the duration exceeds the trigger duration, shutting down the mower and alarming.

Numerically, a threshold of the recovery condition<a threshold of the protection condition<a threshold of the alarm condition<a threshold of the shutdown condition, before the mower stops, if the state of the battery management system, the cutter motor control unit, the walking motor controller, the walking motor or the cutter motor is lower than the recovery condition and the duration exceeds the response duration, the current vehicle speed is increased according to an acceleration ratio coefficient, and meanwhile the rotating speed of the cutter is correspondingly increased along with the increase of the vehicle speed until the normal working state is recovered.

The reduction ratio coefficient is set from 0.7 to 0.9, the acceleration ratio coefficient is set from 1.05 to 1.15, the trigger time is set from 1 s to 3 s, and the response time is set from 5 s to 10 s.

The following provides examples of the management method of the mower system based on the recovery condition, protection condition, alarm condition, and shutdown condition.

Embodiment 1, a temperature-based mower system management method.

Existing electric mowers protect the system from overtemperature burns. When the temperature reaches a preset temperature, it will correspondingly reduce the power of the system to reduce the amount of heat which has drawbacks. For example, when the temperature of the cutter motor triggers the temperature protection, it will reduce cutter power to 50%. Reducing cutter motor power can lead cutter motor stall, to further increase the motor temperature, and trigger shutdown or cause the motor burned, affecting the user experience. To avoid this problem, the present embodiment is adopted technical solutions: the maximum vehicle speed is reduced and the rotating speed of the cutter is reduced correspondingly, when a temperature detected is too high, so that the mowing area decreases per unit time, the actual mowing power required decreases, the overall power consumption of the mower can be effectively reduced and the temperature can be reduced.

Figure 8:
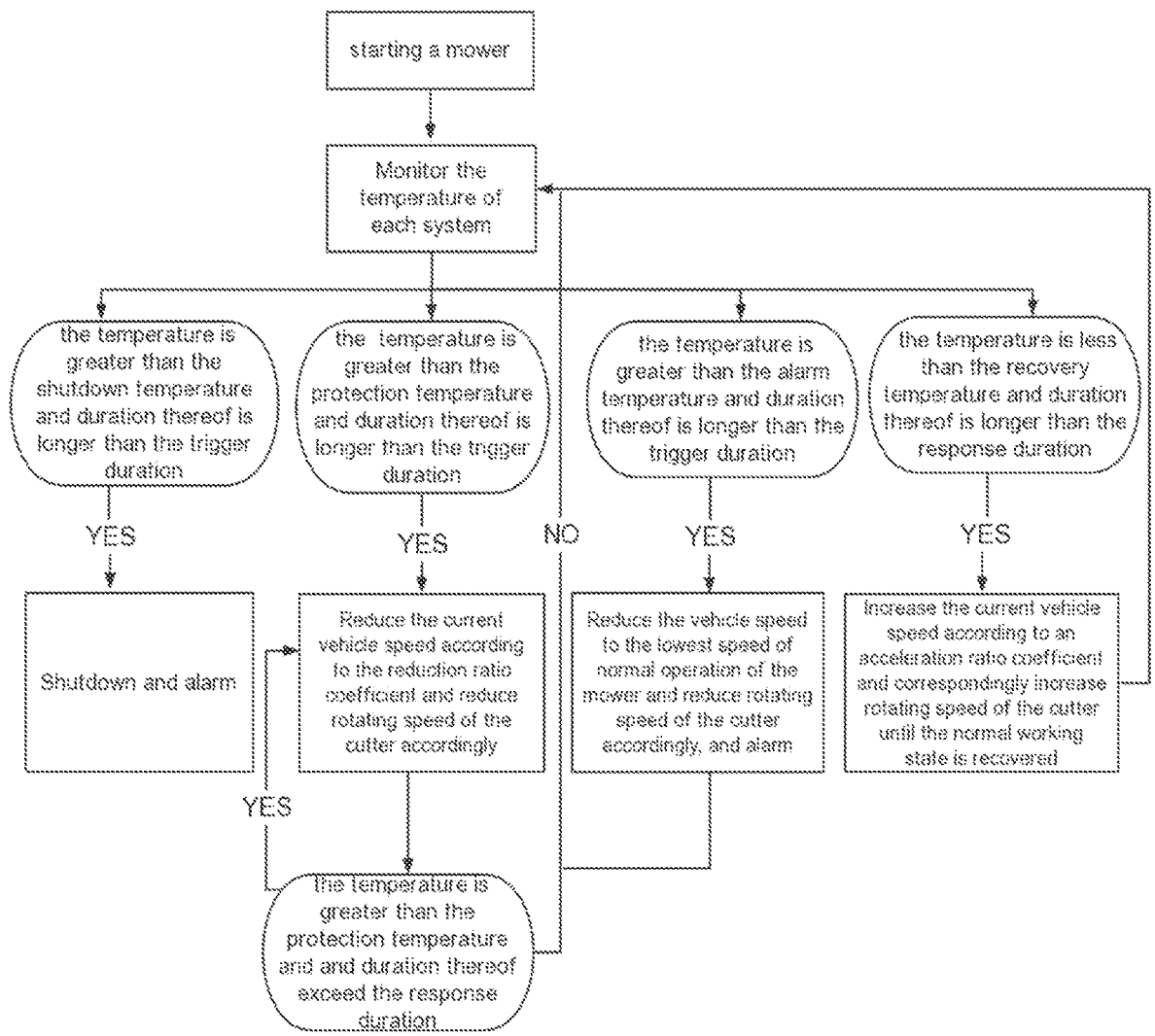
FIG. 8 is a block diagram of a method for managing a mower system based on temperature according to an embodiment of the present disclosure.

As shown in FIG. 8, the recovery condition, the protection condition, the alarm condition and the shutdown condition can be recovery temperature, protection temperature, alarm temperature and shutdown temperature respectively, and management of the mower system is carried out by monitoring the temperature, the method including:

respectively presetting recovery temperature, protection temperature, alarm temperature, shutdown temperature, trigger duration and response duration of a battery management system, a cutter motor control unit, a walking motor controller, a walking motor, and a cutter motor;

if the temperature of any one of the battery management system, the cutter motor control unit, the walking motor controller, the walking motor or the cutter motor is greater than the protection temperature and the duration exceeds the triggering duration, reducing the current vehicle speed according to a speed reduction ratio coefficient, and correspondingly reducing the rotating speed of the cutter along with the reduction of the vehicle speed;

if the duration of the temperature greater than the protection temperature exceeds the response duration and the temperature is still greater than the protection temperature, continuously reducing the current vehicle speed according to the speed reduction ratio coefficient, and simultaneously correspondingly reducing the rotating speed of the cutter along with the reduction of the vehicle speed until the current vehicle speed is less than or equal to the lowest normal operation speed of the mower;

if the temperature is greater than the alarm temperature and the duration exceeds the trigger duration, reducing the vehicle speed to the lowest speed of normal operation of the mower, meanwhile, correspondingly reducing the rotating speed of the cutter along with the reduction of the vehicle speed, and alarming and prompting an operator to check the state of the vehicle; and if the temperature is greater than the shutdown temperature and the duration exceeds the trigger duration, shutting down the mower and alarming.

As shown in Table 1 below, recovery temperatures, protection temperatures, alarm temperatures, shutdown temperatures, trigger time, response time, and the acceleration and deceleration ratio coefficients of the battery management system, cutter motor control unit, walking motor controller, walking motor and cutter motor are set as follows:

TABLE 1

| project | Recovery temperature Tr | Protection temperature Tp | Alarm temperature Ta | Shutdown temperature Ts | Reduction ratio coefficient | Acceleration ratio coefficient | Trigger duration(s) | Response duration(s) |
|---|---|---|---|---|---|---|---|---|
| Battery Management System | 40 | 45 | 50 | 55 | 0.7 | 1.15 | 2 | 10 |
| Cutter motor control unit | 60 | 70 | 80 | 85 | 0.8 | 1.1 | 1 | 5 |
| Walking motor controller | 60 | 70 | 80 | 85 | 0.8 | 1.1 | 1 | 5 |
| Cutter motor | 75 | 95 | 115 | 130 | 0.9 | 1.05 | 3 | 8 |
| Walking motor | 75 | 95 | 115 | 130 | 0.9 | 1.05 | 3 | 8 |

Embodiment 2, a mower system management method based on the discharge current (or power) of the battery management system.

Figure 9:
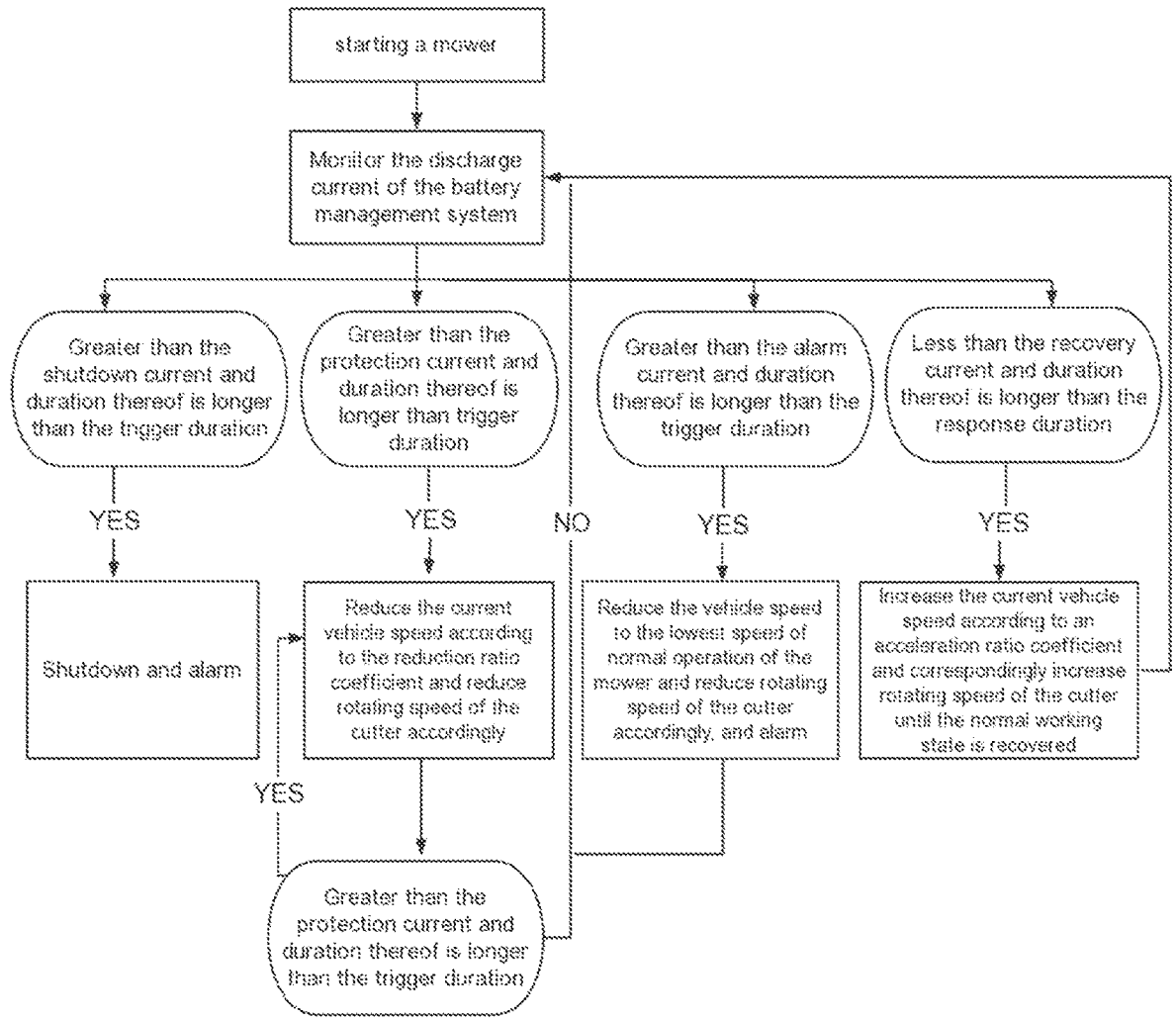
FIG. 9 is a block diagram of a method for managing a mower system based on the discharging current of the battery management system according to an embodiment of the present disclosure
Figure 10:
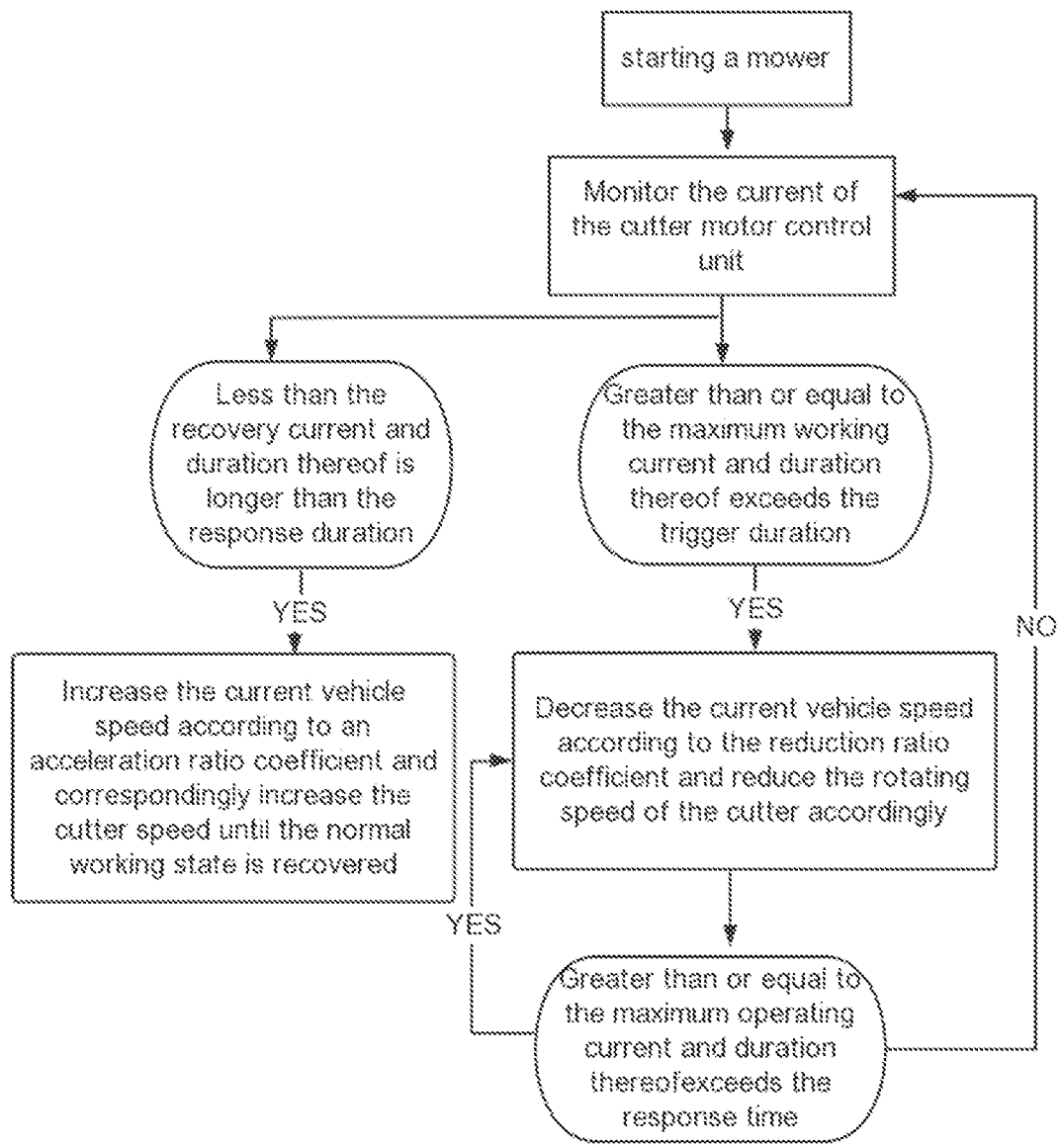
FIG. 10 is a block diagram of a method for managing a mower system based on the current of the cutter motor control unit according to an embodiment of the present disclosure.

As shown in FIG. 9, the recovery condition, the protection condition, the alarm condition and the shutdown condition can be recovery current, protection current, alarm current and shutdown current respectively, and the management of the mower system is carried out by monitoring the discharge current (or power) of the battery management system, the management method including:

presetting recovery current, protection current, alarm current, shutdown current, trigger duration, and response duration of a battery management system;

if the discharge current of the battery management system is greater than the protection current and the duration time exceeds the trigger duration time, reducing the current vehicle speed according to a reduction ratio coefficient, and simultaneously correspondingly reducing the rotating speed of the cutter along with the reduction of the vehicle speed;

if the duration time of the discharge current greater than the protection current exceeds the response duration time and the discharge current is still greater than the protection current, continuously reducing the current vehicle speed according to the speed reduction ratio coefficient, and simultaneously correspondingly reducing the rotating speed of the cutter along with the reduction of the vehicle speed until the current vehicle speed is less than or equal to the lowest normal operation speed of the mower;

if the discharge current is greater than the alarm current and the duration exceeds the trigger duration, reducing the vehicle speed to the lowest normal operation speed of the mower, meanwhile, correspondingly reducing the rotating speed of the cutter along with the reduction of the vehicle speed, and alarming and prompting an operator to check the vehicle state; and if the discharge current is greater than the shutdown current and the duration exceeds the trigger duration time, shutting down the mower and alarming.

Preferably, as shown in Table 2 below, the recovery current, protection current, alarm current, shutdown current, trigger duration and response duration of the battery management system, as well as the acceleration and reduction ratio coefficients are set as follows:

Embodiment 3, a mower system management method based on the current of the cutter motor control unit.

At present, most motor controls have an output current limiting function, the controller is protected while the motor is protected, in general, the controller can work at the maximum working current for a certain time, the efficiency of the controller is low, the temperature rise is fast. In the disclosure, the mower system is managed by monitoring the current of the cutter motor control unit, the management method comprising:

presetting the maximum working current and the recovery current of the cutter motor control unit;

if the current of the cutter motor control unit is greater than or equal to the maximum working current and the duration exceeds the trigger duration, reducing the current vehicle speed according to a speed reduction ratio coefficient, and simultaneously correspondingly reducing the rotating speed of the cutter along with the reduction of the vehicle speed;

if the current of the cutter motor control unit is greater than or equal to the maximum working current and the duration exceeds the response duration, continuously reducing the current vehicle speed according to the speed reduction ratio coefficient, and simultaneously correspondingly reducing the rotating speed of the cutter along with the reduction of the vehicle speed until the current vehicle speed is less than or equal to the lowest normal operation speed of the mower; and if the current of the cutter motor control unit is less than the recovery current and the duration exceeds the response duration, increasing the current vehicle speed according to an acceleration ratio coefficient, and simultaneously correspondingly increasing the rotating speed of the cutter along with the increase of the vehicle speed until the normal working state is recovered.

Presetting the maximum working current of the cutter motor control unit and the recovery current of the cutter motor control unit, wherein the recovery current is smaller than the maximum working current; meanwhile, the maximum working voltage of the cutter motor control unit and the recovery voltage of the cutter motor control unit can be preset, and the recovery voltage is smaller than the maximum working voltage.

As shown in Table 3 below, the maximum operating current, the recovery current, the trigger duration, the response duration of the cutter motor control unit, and the acceleration ratio coefficient and the reduction ratio coefficient are set as follows:

TABLE 2

|  | Recovery current Ir | Protection current It | Alarm current Ia | Shutdown current Is | Reduction ratio coefficient | Acceleration factor | Trigger time (s) | Response time (s) |
| --- | --- | --- | --- | --- | --- | --- | --- | --- |
| Battery Management System | 200 | 225 | 250 | 270 | 0.8 | 1.1 | 2 | 5 |

TABLE 3

| | Recovery current | Maximum working current | Reduction ratio coefficient | Acceleration ratio coefficient | Trigger duration(s) | Response duration(s) |
|---|---|---|---|---|---|---|
| Cutter motor control unit | 60 | 70 | 0.8 | 1.1 | 1 | 5 |

In summary, the cutter rotating speed can be adjusted instantly according to the change of the vehicle speed, so that the system efficiency is improved; meanwhile, when the cutter motor enters the limit state, the vehicle speed can be limited, the cutter motor is protected while the mowing effect is met, and the energy consumption of the mower is reduced.

The above embodiments are only used to illustrate the technical solutions of the disclosure and not to limit them. Although the disclosure has been described in detail with reference to the preferred embodiments, those of ordinary skill in the art should understand that the technical solutions of the disclosure can be modified or equivalently replaced. Without departing from the spirit and scope of the technical solution of the disclosure.

What is claimed is:

1. A mower system comprising:
   a vehicle control unit, which is used for controlling a mower to operate;
   a walking unit, including a walking motor controller and a walking motor, which are used for receiving a control signal from the vehicle control unit to control the walking of the mower and provide a state feedback to the vehicle control unit;
   a cutter unit, including at least one cutter, a cutter motor used for driving the cutter to operate, and a cutter motor control unit used for controlling the cutter motor, wherein the cutter motor control unit receives a control signal sent by the vehicle control unit to control the cutter to operate and carries out a state feedback to the vehicle control unit; and
   a battery management system, which is used for performing a state feedback on the working state of a battery to the vehicle control unit, wherein
   a rotating speed of the cutter is adjusted by the vehicle control unit according to a vehicle speed to reduce an energy consumption of the mower;
   wherein, when the vehicle speed of the mower is V, the rotating speed of the cutter is set as follows:

$n = n_0 + (V - V_0) * K_g$ wherein, n is the current rotating speed of the cutter, V is greater than or equal to $V_0$, $K_g$ is a ratio of rotating speed of the cutter to vehicle speed and $K_g$ is a fixed value;
   the formula of the cutter rotating speed to vehicle speed ratio $K_g$ is as follows:

$K_g = (n_{max} - n_0)/(V_{max} - V_0)$, wherein $V_0$ is the lowest speed for normal operation of mower, $n_0$ is the lowest operating speed of the cutter, $V_{max}$ is the highest speed for normal operation of mower, and $n_{max}$ is the highest operating speed of the cutter;
   wherein, when a state of any one of the battery management system, the cutter motor control unit, the walking motor controller, the walking motor or the cutter motor meets a preset protection condition and a duration of meeting the protection condition exceeds a preset trigger duration, the vehicle speed is reduced according to a reduction ratio coefficient, so as to reduce the rotating speed of the cutter, and when the state of any one of the battery management system, the cutter motor control unit, the walking motor controller, the walking motor or the cutter motor is lower than a preset recovery condition and the duration exceeds a response duration, the vehicle speed is increased according to an acceleration ratio coefficient, so as to increase the rotating speed of the cutter.

2. The mower system according to claim 1, wherein the vehicle control unit adjusts the rotating speed of the cutter based on a fixed ratio to the vehicle speed.

3. The mower system according to claim 2, further comprising a cutter governor switch, wherein the vehicle control unit receives a signal generated by the cutter governor switch to regulate the rotating speed of the cutter based on an adjustable ratio to the vehicle speed.

4. The mower system according to claim 1, wherein the state feedback of the walking unit comprises: a vehicle speed of the mower, a rotating speed of the walking motor, a temperature of the walking motor, a temperature of the walking motor controller, and a power of the walking motor.

5. The mower system according to claim 1, wherein the state feedback of the cutter unit comprises: a temperature of the cutter motor control unit, a power of the cutter motor, a rotating speed of the cutter motor, and a temperature of the cutter motor.

6. The mower system according to claim 1, wherein the state feedback of the battery management system comprises: an output power and a temperature of the battery.

7. A method for setting a rotating speed of a cutter of a mower system, the mower system having:
   a vehicle control unit, which is used for controlling a mower to operate;
   a walking unit, including a walking motor controller and a walking motor, which are used for receiving a control signal from the vehicle control unit to control the walking of the mower and provide a state feedback to the vehicle control unit;
   a cutter unit, including at least one cutter, a cutter motor used for driving the cutter to operate and a cutter motor control unit used for controlling the cutter motor, wherein the cutter motor control unit receives a control signal sent by the vehicle control unit to control the cutter to operate and carries out a state feedback to the vehicle control unit; and
   a battery management system, which is used for performing a state feedback on the working state of a battery to the vehicle control unit; wherein
   a rotating speed of the cutter is adjusted by the vehicle control unit according to a vehicle speed, so that an energy consumption of the mower is reduced while a mowing efficiency is improved, wherein the ratio of the rotating speed of the cutter to the vehicle speed is a fixed value, the method comprising:
starting the mower;
setting the rotating speed of the cutter to be as a lowest rotating speed $n_0$ for the operation of the cutter when the vehicle speed V of the mower is less than a lowest speed $V_0$ for normal operation of mower; and
setting the rotating speed of the cutter to be as a current rotating speed n, when the vehicle speed V is greater than or equal to $V_0$;
wherein, when the vehicle speed of the mower is V, the rotating speed of the cutter is set as follows:

$$n=n_0+(V-V_0)*K_g$$

wherein V is greater than or equal to $V_0$, $K_g$ is a ratio of rotating speed of the cutter to vehicle speed and $K_g$ is a fixed value; the formula of the cutter rotating speed to vehicle speed ratio $K_g$ is as follows:

$$K_g=(n_{max}-n_0)/(V_{max}-V_0),$$

wherein $V_0$ is the lowest speed for normal operation of mower, $n_0$ is the lowest operating speed of the cutter, $V_{max}$ is the highest speed for normal operation of mower, and $n_{max}$ is the highest operating speed of the cutter;
wherein, when a state of any one of the battery management system, the cutter motor control unit, the walking motor controller, the walking motor or the cutter motor meets a preset protection condition and a duration of meeting the protection condition exceeds a preset trigger duration, the vehicle speed is reduced according to a reduction ratio coefficient, so as to reduce the rotating speed of the cutter, and when the state of any one of the battery management system, the cutter motor control unit, the walking motor controller, the walking motor or the cutter motor is lower than a preset recovery condition and a duration of being lower than the recovery condition exceeds a preset response duration, the vehicle speed is increased according to an acceleration ratio coefficient, so as to increase the rotating speed of the cutter.

8. The method for setting the rotating speed of the cutter according to claim 7, wherein
the mower system further comprises a cutter governor switch to output a control signal to the vehicle control unit, and the vehicle control unit regulates the ratio of the rotating speed of the cutter to the vehicle speed according to the control signal.

9. The method for setting the rotating speed of the cutter according to claim 8, wherein
the mower system is provided with the cutter governor switch, the formula of the rotating speed of the cutter to vehicle speed ratio is as follows:

$$K_b=K_1*(n_{max}-n_0)/(V_{max}-V_0),$$

$K_b$ is a cutter rotating speed to vehicle speed ratio, and the value of $K_1$ depends on the control signal input by the cutter governor switch.

10. A method for managing a mower system and improving the stability of the mower system, the mower system being the mower system of claim 1, the method comprising:
respectively presetting the recovery conditions, the protection conditions, alarm conditions, shutdown conditions, the trigger duration and the response duration of the battery management system, the cutter motor control unit, the walking motor controller, the walking motor and the cutter motor in the mower system;
reducing current vehicle speed according to the reduction ratio coefficient and correspondingly reducing the rotating speed of the cutter along with a reduction of the vehicle speed, when the state of any one of the battery management system, the cutter motor control unit, the walking motor controller, the walking motor or the cutter motor meets the protection condition and a duration of the protection condition exceeds the triggering duration;
when the protection condition is still met and the duration of the protection condition exceeds the response duration, continuously reducing the current vehicle speed according to the reduction ratio coefficient, and simultaneously correspondingly reducing the rotating speed of the cutter along with the reduction of the vehicle speed until the current vehicle speed is less than or equal to a lowest normal operation speed of the mower;
when the alarm condition is met and a duration of the alarm condition exceeds the trigger duration, reducing a vehicle speed to the lowest normal operation speed of the mower, correspondingly reducing the rotating speed of the cutter along with the reduction of the vehicle speed, and alarming and prompting an operator to check a vehicle state; and
when the shutdown condition is met and a duration of the shutdown condition exceeds the trigger duration, shutting down the mower and alarming.

11. The method for managing the mower system according to claim 10, wherein
numerically, a threshold of the recovery condition<a threshold of the protection condition<a threshold of the alarm condition <a threshold of the shutdown condition.

12. The method for managing the mower system according to claim 10, wherein
the reduction ratio coefficient is set from 0.7 to 0.9.

13. The method for managing the mower system according to claim 10, wherein
the trigger duration is set from 1 s to 3 s.

14. The method for managing the mower system according to claim 10, wherein
the response duration is set from 5 s to 10 s.

15. The method for managing the mower system according to claim 10, wherein
before the mower stops, when the state of any one of the battery management system, the cutter motor control unit, the walking motor controller, the walking motor or the cutter motor is lower than the recovery condition and the duration thereof exceeds the response duration, the current speed is increased according to the acceleration ratio coefficient, and the rotating speed of the cutter is correspondingly increased along with the increase of the speed until a normal working state is recovered.

16. The method for managing the mower system according to claim 15, wherein
the acceleration ratio coefficient is set from 1.05 to 1.15.

17. The method for managing the mower system according to claim 10, wherein
the recovery condition, the protection condition, the alarm condition and the shutdown condition are recovery temperature, protection temperature, alarm temperature and shutdown temperature respectively, and energy consumption management is carried out by monitoring a temperature, the method including:
respectively presetting recovery temperatures, protection temperatures, alarm temperatures, shutdown temperatures, trigger duration and response duration of the battery management system, the cutter motor control unit, the walking motor controller, the walking motor and the cutter motor;

when the temperature of any one of the battery management system, the cutter motor control unit, the walking motor controller, the walking motor or the cutter motor is greater than the protection temperature and the duration thereof exceeds the trigger duration, reducing the current vehicle speed according to a speed reduction ratio coefficient, and correspondingly reducing the rotating speed of the cutter along with the reduction of the vehicle speed;

when the duration of the temperature greater than the protection temperature exceeds the response duration and the temperature is still greater than the protection temperature, continuously reducing the current vehicle speed according to the reduction ratio coefficient, and simultaneously correspondingly reducing the rotating speed of the cutter along with the reduction of the vehicle speed until the current vehicle speed is less than or equal to the lowest normal operation speed of the mower; and when the temperature is greater than the alarm temperature and the duration thereof exceeds the trigger duration, reducing the speed to the lowest speed of normal operation of the mower, meanwhile, correspondingly reducing the rotating speed of the cutter along with the reduction of the speed, and alarming and prompting an operator to check the state of the vehicle;

when the temperature is greater than the shutdown temperature and the duration thereof exceeds the triggering duration, shutting down the mower and alarming.

18. The method for managing the mower system according to claim 10, wherein the recovery condition, the protection condition, the alarm condition and the shutdown condition are recovery current, protection current, alarm current and shutdown current respectively, and energy consumption management is carried out by monitoring a discharge current of the battery management system, the method further comprising:

presetting recovery current, protection current, alarm current, shutdown current, trigger duration and response duration of the battery management system;

when the discharge current of the battery management system is greater than the protection current and the duration thereof exceeds the trigger duration, reducing the current vehicle speed according to the reduction ratio coefficient, and simultaneously correspondingly reducing the rotating speed of the cutter along with the reduction of the vehicle speed;

when the duration of the discharge current greater than the protection current exceeds the response duration and the discharge current is still greater than the protection current, continuously reducing the current vehicle speed according to the reduction ratio coefficient, and simultaneously correspondingly reducing the rotating speed of the cutter along with the reduction of the vehicle speed until the current vehicle speed is less than or equal to the lowest normal operation speed of the mower;

when the current is greater than the alarm current and the duration thereof exceeds the trigger duration, reducing the vehicle speed to the lowest normal operation speed of the mower, meanwhile, correspondingly reducing the rotating speed of the cutter along with the reduction of the vehicle speed, and alarming and prompting an operator to check the vehicle state; and when the current is greater than the shutdown current and the duration thereof exceeds the triggering duration, shutting down the mower and alarming.

19. The method for managing the mower system according to claim 10, wherein carrying out energy consumption management by monitoring a current of the cutter motor control unit, and the method further comprising:

presetting a maximum working current and the recovery current of the cutter motor control unit;

when the current of the cutter motor control unit is greater than or equal to the maximum working current and the duration thereof exceeds the trigger duration, reducing the current vehicle speed according to the reduction ratio coefficient, and simultaneously correspondingly reducing the rotating speed of the cutter along with the reduction of the vehicle speed until the current vehicle speed is less than or equal to the lowest normal operation speed of the mower;

when the current of the cutter motor control unit is greater than or equal to a maximum working current and the duration thereof exceeds the response duration, continuously reducing the current vehicle speed according to the reduction ratio coefficient, and simultaneously correspondingly reducing the rotating speed of the cutter along with the reduction of the vehicle speed until the current vehicle speed is less than or equal to the lowest normal operation speed of the mower; and when the current of the cutter motor control unit is less than the recovery current and the duration thereof exceeds the response duration, increasing the current vehicle speed according to the acceleration ratio coefficient, and simultaneously correspondingly increasing the rotating speed of the cutter along with the increase of the vehicle speed until a normal working state is recovered.

* * * * *